(12) United States Patent
McMahan et al.

(10) Patent No.: US 8,720,206 B2
(45) Date of Patent: May 13, 2014

(54) METHODS AND SYSTEMS FOR INDUCING COMBUSTION DYNAMICS

(75) Inventors: Kevin Weston McMahan, Greer, SC (US); Mark Allan Hadley, Greenville, SC (US); Geoffrey D. Myers, Simpsonville, SC (US); Sam D. Draper, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 750 days.

(21) Appl. No.: 12/466,184

(22) Filed: May 14, 2009

(65) Prior Publication Data

US 2010/0287943 A1  Nov. 18, 2010

(51) Int. Cl.
*F02C 9/48* (2006.01)

(52) U.S. Cl.
USPC .......... 60/779; 60/39.26; 60/39.53; 60/39.55; 60/775; 60/39.3

(58) Field of Classification Search
USPC ......... 60/39.26, 39.3, 39.53, 39.55, 772, 775, 60/779; 73/112.01
See application file for complete search history.

(56) References Cited

U.S. PATENT DOCUMENTS

| | | | |
|---|---|---|---|
| 2,940,253 A * | 6/1960 | Carr | 60/779 |
| 3,826,080 A * | 7/1974 | De Corso et al. | 60/39.55 |
| 4,335,600 A * | 6/1982 | Wu et al. | 73/112.03 |
| 5,491,970 A | 2/1996 | Davis, Jr. et al. | |
| 5,758,486 A * | 6/1998 | Fetescu | 60/779 |
| 5,819,540 A | 10/1998 | Massarani | |
| 5,943,866 A | 8/1999 | Lovett et al. | |
| 5,985,122 A | 11/1999 | Conner | |
| 6,205,765 B1 | 3/2001 | Iasillo et al. | |
| 6,272,842 B1 | 8/2001 | Dean | |
| 6,354,071 B2 | 3/2002 | Tegel et al. | |
| 6,519,944 B2 * | 2/2003 | Smith | 60/773 |
| 6,820,431 B2 | 11/2004 | McManus et al. | |
| 6,823,253 B2 | 11/2004 | Brunell | |
| 6,923,002 B2 | 8/2005 | Crawley et al. | |
| 6,976,351 B2 | 12/2005 | Catharine et al. | |
| 7,032,388 B2 | 4/2006 | Healy | |
| 7,104,070 B2 | 9/2006 | Iasillo et al. | |
| 7,246,002 B2 | 7/2007 | Healy et al. | |
| 7,320,213 B2 | 1/2008 | Shah et al. | |
| 2002/0063479 A1 * | 5/2002 | Mitchell et al. | 307/153 |

FOREIGN PATENT DOCUMENTS

| | | |
|---|---|---|
| CN | 1618535 A | 5/2005 |
| CN | 2906351 Y | 5/2007 |
| JP | H08327046 A | 12/1996 |

OTHER PUBLICATIONS

Chinese Office Action dated Oct. 31, 2013.

* cited by examiner

*Primary Examiner* — William H Rodriguez
*Assistant Examiner* — Steven Sutherland
(74) *Attorney, Agent, or Firm* — Fletcher Yoder, P.C.

(57) ABSTRACT

Methods and systems are provided for inducing combustion dynamics within turbine engines to remove combustion deposits within the turbine engine during operation of the turbine engine.

29 Claims, 5 Drawing Sheets

METHODS AND SYSTEMS FOR INDUCING COMBUSTION DYNAMICS

BACKGROUND OF THE INVENTION

The subject matter disclosed herein relates to inducing combustion dynamics, and, more specifically, to inducing combustion dynamics to remove ash within gas turbine engines.

In general, gas turbine engines combust a mixture of compressed air and fuel to produce hot combustion gases. The combustion gases may flow through one or more turbine stages to generate power for a load and/or a compressor. As the demand for energy has increased, gas turbine operators and manufacturers have increasingly explored the use of heavy fuel oils in gas turbines. However, the combustion of heavy fuel oils may produce ash which may settle on components of the gas turbine engines.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method includes measuring a first parameter of a turbine engine, controlling a second parameter of the turbine engine to increase combustion dynamics to remove deposits within the turbine engine at least partially in response to the measurement of the first parameter, and controlling the second parameter of the turbine engine to reduce combustion dynamics after removal of the deposits.

In a second embodiment, a system includes a turbine engine controller configured to temporarily increase combustion instabilities to remove combustion deposits within the turbine engine during operation of the turbine engine.

In a third embodiment, a system includes a turbine engine, a combustor, and a fuel nozzle. The fuel nozzle is designed to supply a plurality of fluids into the combustor. The fluids include fuel, atomizing air, water, or a combination thereof. The turbine engine is designed to adjust flow of the fluids to temporarily increase combustion dynamics to remove deposits within the turbine engine during operation of the turbine engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
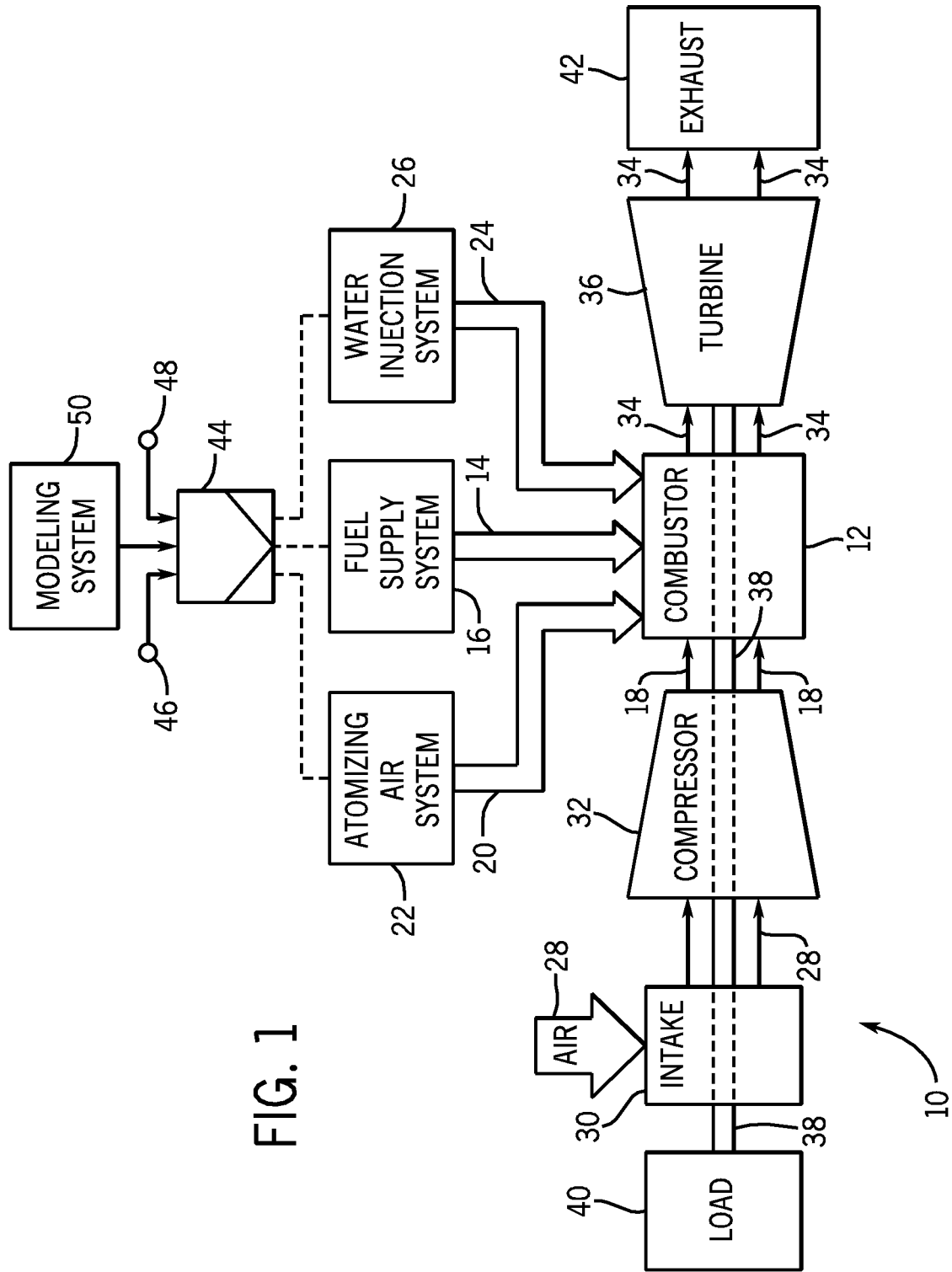
FIG. 1 is a schematic flow diagram of an embodiment of a gas turbine engine with a controller for inducing combustion dynamics to remove ash.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to gas turbine engines designed to induce combustion dynamics to remove deposits, such as ash. In general, during combustion, particularly of heavy fuel oils, ash particles may be deposited on gas turbine engine components, such as the first stage nozzle guide vanes and turbine blades. Collection of ash within the gas turbine engine may alter the flow path for the combustion gases, which in turn may impair performance and/or efficiency of the gas turbine engine. As discussed below, certain embodiments of the presently disclosed gas turbine engines may employ controllers for inducing combustion dynamics to remove ash, rather than performing turbine washing which may result in a reduction in power or engine shutdown and also may employ additional hardware components.

Accordingly, in present embodiments, gas turbine engines are designed to induce combustion dynamics to sonically remove ash. The induced combustion dynamics may generally include induced and/or increased pressure oscillations within the gas turbine engines. Combustion dynamics may allow ash to be removed while the gas turbine engine is operating at substantially full power. According to exemplary embodiments, the combustion dynamics may be induced and/or governed based on time, measured parameters, model parameters, or combinations thereof. In certain embodiments, a gas turbine engine may include a controller that detects ash buildup based on parameters received from sensors and/or modeling systems for the gas turbine engine. For example, the controller may receive pressure values from dynamic pressure sensors designed to measure combustor or downstream pressures. The pressures may indicate a decrease in turbine performance from ash buildup. In certain embodiments, the gas turbine engine may include a real time modeling system that receives parameters from the sensors. The modeling system may use the sensed parameters to calculate system modeling parameters, such as model component multipliers, that predict performance of the gas turbine engine. In addition to, or instead of the sensed parameters, the controller may use the modeling parameters to determine when ash has collected within the gas turbine engine.

The controller may then adjust operational parameters of the gas turbine engine to induce combustion dynamics to remove ash. For example, the combustion instabilities may include dynamic pressure oscillations in the combustion chamber that shake ash deposits loose from turbine engine components. According to exemplary embodiments, the controller may adjust a flow of fluids entering the combustor to induce combustion dynamics. For example, the controller may increase or decrease a flow rate, pressure, temperature, or pulse frequency of one or more fluids, such as air, fuel, water, diluent, or the like, entering the combustor. In another example, the controller may increase or decrease a ratio between fluids entering the combustor. In a specific example, the controller may increase the water flow rate from a water injection system to increase the water to fuel ratio entering the combustor. In another example, the controller may adjust the pressure of atomizing air to alter the fuel injection spray angle. In yet another example, the controller may pulse the fuel at a frequency designed to induce combustion dynamics.

Turning now to the drawings and referring first to FIG. 1, a block diagram of an embodiment of a gas turbine engine 10 is illustrated. The gas turbine engine 10 may be part of a simple cycle system or a combined cycle system. The gas turbine engine 10 includes a combustor 12 that receives fuel 14 from a fuel supply system 16. Fuel supply system 16 may provide a liquid or gaseous fuel 14, such as natural gas, light or heavy distillate oil, naphtha, crude oil, residual oil, or syngas, to the gas turbine engine 10. In certain embodiments, the fuel supply system 16 may be configured for dual-fuel operation to selectively switch between liquid and gaseous fuels while the gas turbine engine 10 is operating under a load. The gaseous fuel and the liquid fuel may be directed to two separate liquid and gas passages within the combustor 12 (e.g., via the fuel nozzle). Inducement of combustion dynamics may be particularly useful when the gas turbine engine is operating on liquid fuel or on combinations of liquid and gaseous fuel.

Within the combustor 12, the fuel 14 may mix with pressurized air, shown by arrow 18, and ignition may occur, producing hot combustion gases that power the gas turbine engine 10. In addition to receiving pressurized air 18, the combustor 12 may receive atomizing air 20 from an atomizing air system 22. The atomizing air system 22 may process a portion of the pressurized air 18 and/or air from a separate air supply. For example, the atomizing air system 22 may compress and cool a small portion of the pressurized air 18 to produce the atomizing air 20. The atomizing air system 22 may then direct the atomizing air 20 to combustor 12 where the atomizing air 20 may atomize the fuel 14 entering the combustor 12. In certain embodiments, the atomizing air 20 may be designed to produce a fine spray of liquid fuel 14 entering the combustor 12.

The combustor 12 also may receive water 24 (or steam) from a water injection system 26. As used herein, the term "water injection system" may generally include a water injection system or a steam injection system designed to supply water, steam, or combinations thereof to the combustor 12. The water injection system 26 may regulate the flow of water 24 from a water supply source to the combustor 12. The water injection system 26 may include an integrated package, such as an equipment skid, that houses equipment, such as pumps, flow meters, valves, piping, pressure switches, motors, and the like, configured to regulate the flow of water 24 to the combustor 12. In certain embodiments, the water injection system 22 may supply the water 24 to the combustor 12 to reduce emissions of compounds such as oxides of nitrogen (NOx) or carbon dioxide, among others. In other embodiments, the water injection system 22 may provide water and/or diluents such as steam, water, or carbon dioxide, among others, to the combustor 12 to reduce emissions and/or enhance turbine performance.

Within the combustor 12, the pressurized air 18 may combust with the fuel 14 to produce hot combustion gases 40. The pressurized air 18 may include intake air 28 that enters the gas turbine system 10 through an air intake section 30. The intake air 28 may be compressed by a compressor 32 to produce the pressurized air 18 that enters the combustor 12. In certain embodiments, one or more fuel nozzles may direct the fuel 14, the atomizing air 20, and the water 24 into the combustion zone of the combustor 12. Within the combustion zone, the pressurized air 18 may combust with the fuel 14 to produce the hot combustion gases 34. From the combustor 12, the hot combustion gases 34 may flow through a turbine 36 that drives the compressor 32 via a shaft 38. For example, the combustion gases 34 may apply motive forces to turbine rotor blades within the turbine 36 to rotate the shaft 38. Shaft 28 also may be connected to a load 40, such as a generator, a propeller, a transmission, or a drive system, among others. After flowing through the turbine 36, the hot combustion gases 34 may exit the gas turbine system 10 through an exhaust section 42.

During combustion, the combustor 12 may be prone to combustion instabilities or dynamics, such as pressure fluctuations. During steady state operation, combustion dynamics may normally be kept low to sustain hardware during long term exposure to dynamics driven cyclic stress. However, during combustion of certain fuels, such as heavy fuel oils, combustion instabilities may be increased and/or induced for relatively short periods to sonically remove ash from components of the gas turbine engine 10. For example, combustion dynamics may be used to increase pressure variations to shake loose deposits within the combustor 12, or within components of the turbine 36, such as a turbine nozzle, turbine blade, or turbine shroud.

The gas turbine engine 10 includes a controller 44 that may be designed to induce or increase combustion dynamics based on time, measured parameters, modeled parameters, or combinations thereof. The controller 44 may be operably coupled to fluid supply lines or systems, such as the fuel supply system 16, the atomizing air system 22, and/or the water injection system 26 to vary parameters of fluids, such as the fuel 14, air 20, and/or water 24, entering the combustor 12. Specifically, the controller 44 may vary fluid parameters, such as flow rate, pulse frequency, ratio, pressure, temperature, or the like, to induce combustion dynamics. For example, the controller 44 may pulse the fuel 14 entering the combustor 12 to induce combustion dynamics. In another example, the controller 44 may alter the pressure of the atomizing air 20 to induce combustion dynamics. In yet another example, the controller 44 may increase the amount of water 24 entering the combustor 12 to induce combustion dynamics. Further, in certain embodiments, the controller 44 may vary parameters for one fluid or for combinations of two or more fluids. The controller 44 may govern operation of valves, or other control devices, within, upstream of, or downstream of the fuel supply system 16, the atomizing air system 22, and/or the water injection system 26. For example, the valves may be located within the systems 16, 22, and 26, or the valves may be located within the combustor 12, for example, as part of a fuel nozzle.

The controller 44 may vary parameters of the fuel 14, air 20, and/or the water 24 based on inputs received from sensors 46 and 48 and/or a modeling system 50. Specifically, one or more sensors 46 may measure parameters of the gas turbine engine 10 to determine when combustion dynamics should be induced to remove ash. For example, sensor 46 may include a pressure sensor located within the combustor 12 or downstream of the combustor 12. Upon receiving a pressure value from sensor 46, the controller 44 may determine whether the pressure value falls within a range or threshold that indicates that ash removal should be performed. If the pressure value falls within the range, the controller 44 may induce combustion dynamics. In other embodiments, the sensor 46 may be designed to measure any suitable parameter or parameters of the gas turbine engine 10 that may indicate ash buildup. For example, the sensor 46 may include a flow sensor, flame detector sensor, humidity sensor, emissions detector, power output sensor, guide vane angle sensor, valve position sensor, temperature sensor, or combinations thereof, among others. Further, in other embodiments, a sensor 46 may not be employed and the controller 44 may receive operational inputs, such as operating hours, demand, efficiency, or the like, from a computer and/or control system coupled to the gas turbine engine 10. For example, the controller 44 may induce combustion dynamics after a certain amount of operating hours have passed.

The controller 44 also may receive measured parameters from one or more sensors 48 for determining how combustion dynamics should be induced. For example, sensor 48 may sense pressure oscillations within the combustor 12. Specifically, sensor 48 may sense vibrations, flame temperature, combustor pressures, or downstream pressures, among other parameters. Based on the measurements from the sensor 48, the controller may determine an amount by which to vary a parameter (i.e. flow rate, pulse rate, or pressure) of the fluids 14, 20, and 24 entering the combustor 12. The sensor 48 may be designed to measure any suitable parameter or parameters of the gas turbine engine 10 related to combustion dynamics. For example, the sensor 48 may include a pressure sensor, accelerometer, photomultiplier, photodiode, pressure transducer, microphone, flame detector, temperature sensor, or combinations thereof, among others.

In certain embodiments, a separate sensor 48 may not be employed in addition to sensor 46. For example, in certain embodiments, one or more sensors 46 may measure parameters for determining both how and when combustion dynamics should be induced. In another example, the controller 44 may use models, tables, or the like, to determine how combustion dynamics should be induced. In these embodiments, the sensor 48 may not be included.

The controller 44 also may use measured parameters from the sensor 46 to determine when to cease inducing combustion dynamics. For example, when sensor 46 provides a pressure value, vibration level, flame temperature, or other parameter, to the controller 44 that falls within outside of a range or threshold for ash removal, the controller 44 may return the parameters of the fluids 14, 20, and 24 to values designed to reduce combustion dynamics. In certain embodiments, the measurements provided by the sensor 46 may indicate when enough ash has been removed from components of the gas turbine engine 10 to restore the operations of the gas turbine engine to a certain performance level. In other words, parameters, such as pressures, temperatures, or combinations thereof, among others, measured by the sensor 46 may indicate that the gas turbine engine 10 has resumed a level of performance or efficiency that indicates a low level of ash.

The controller 44 also may cease inducing combustion dynamics after a set time. For example, the controller 44 may cease inducing combustion dynamics after a period of less than approximately 1 to 10 minutes, and all subranges therebetween. More specifically, the controller 44 may cease inducing combustion dynamics after a period of approximately 4 to 6 minutes. However, in other embodiments, any suitable period may be employed. Further, the period may depend on factors such as the amount of ash buildup sensed, the engine load, the efficiency achieved, or the fuel utilized, among others.

In certain embodiments, instead of, or in addition to using parameters sensed by sensor 46 to indicate when to induce combustion dynamics, the controller 44 may induce combustion dynamics based on inputs received from a modeling system 50. For example, the gas turbine engine 10 may employ a real time model to predict performance for the gas turbine engine 10. The model may be based on performance predicted for a new and/or clean gas turbine engine. The modeling system 50 may measure input parameters, such as ambient temperature, ambient pressure, ambient humidity, and fuel flow, among others, for the operational gas turbine engine 10. In certain embodiments, the modeling system 50 may receive the measured parameters from the sensor 46 and/or the sensor 48. The modeling system 50 may then compare the measured input parameters to the values calculated based on the model. Based on the difference between the measured parameters and the model predicted values, the modeling system 50 may calculate model component multipliers. The modeling system 50 may use the model component multipliers to manipulate the model to align the measured input parameters with the model predicted values. For example, the model component multipliers may include a compressor efficiency multiplier, a compressor flow capacity multiplier, a turbine efficiency multiplier, a turbine flow capacity multiplier, and a combustor efficiency multiplier, among others.

The controller 44 may receive the model component multipliers from the modeling system 50 and use the model component multipliers to determine when to induce combustion dynamics. For example, the model component multipliers may indicate the level of ash or fouling within the gas turbine engine 10. In certain embodiments, the controller 44 may determine whether the model component multipliers fall with a range or threshold indicating that ash should be removed. Upon detecting that ash should be removed, the controller 44 may induce combustion dynamics by varying a parameter of the fluids 14, 20, and 24, as described above.

According to exemplary embodiments, the controller 44 may include control circuitry and components, such as an analog to digital converter, a microprocessor, a non volatile memory, and an interface board. Other devices may, of course, be included in the system, such as additional switches, transducers, or sensors measuring pressure, temperature, flow rate, vibration, or humidity, among others. In certain embodiments, the controller 44 may regulate combustion dynamics based on a combination of sensors 46 and 48, and the modeling system 50. Further, the controller 44 also may receive input from a separate control system that specifies operational parameters, such as the fuel composition, for example, by operator input.

Figure 2:
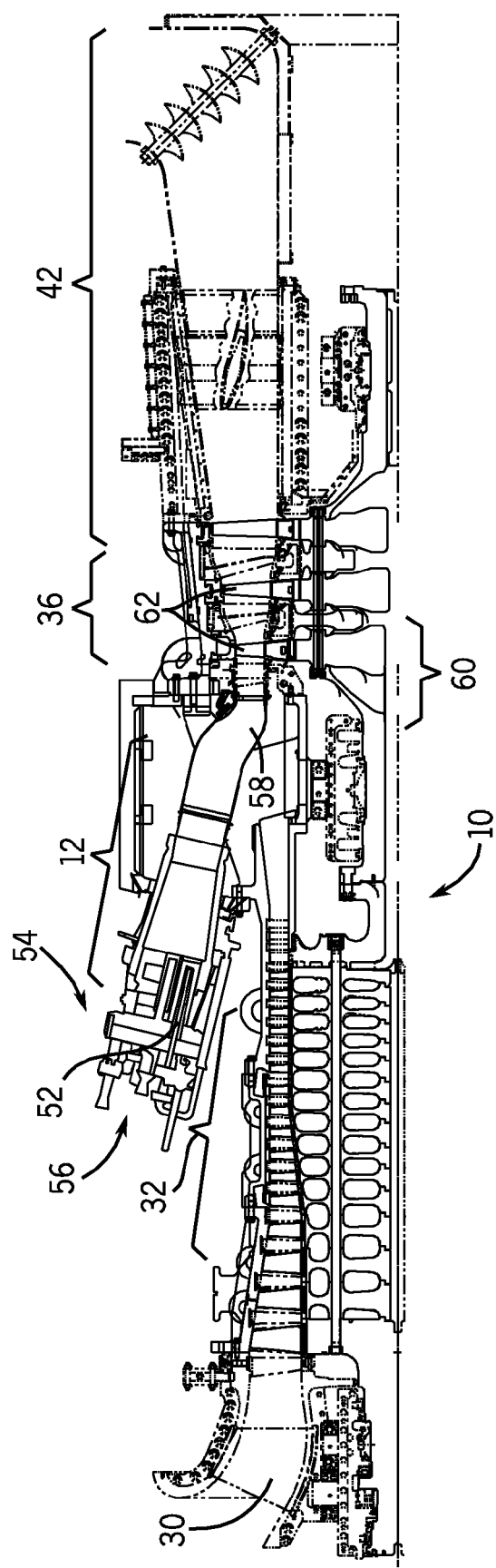
FIG. 2 is a sectional view of an embodiment of the gas turbine engine of FIG. 1 sectioned through the longitudinal axis.

FIG. 2 is a cross sectional side view of an embodiment of the gas turbine engine 10 of FIG. 1. The gas turbine engine 10 includes one or more fuel nozzles 52 within a head end 54 of the combustor 12. In certain embodiments, the gas turbine engine 10 may include multiple combustors 12 disposed in an annular arrangement. The fuel nozzles 52 may receive the fuel 14 (FIG. 1), the atomizing air 20 (FIG. 1), and the water 24 (FIG. 1) through connections 56 attached to the head end 52.

As described above with respect to FIG. 1, air may enter the gas turbine engine 10 through the air intake section 30 and be compressed by the compressor 32. The compressed air from the compressor 32 may then be directed into the combustor 12 where the compressed air 18 (FIG. 1) may be mixed with the fuel 14 (FIG. 1). For example, the fuel nozzles 52 may inject a fuel mixture into the combustor 12 in a suitable ratio for optimal combustion, emissions, fuel consumption, and power output. The hot exhaust gases 38 (FIG. 1) produced by combustion may exit the combustor 12 to a transition section 58 and flow through the transition section 58 to the first stage 60 of the turbine 36. In certain embodiments, ash may be deposited on components of the first stage 60 as the hot exhaust gases 38 flow to the turbine 36. Further, ash may collect downstream of the first stage 60. As described above with respect to FIG. 1, the ash may be removed by inducing combustion dynamics. Within the turbine 36, the combustion gases may turn blades 62 that extend radially within the turbine 36 to rotate the shaft 38 (FIG. 1) before exiting through the exhaust section 42.

Figure 3:
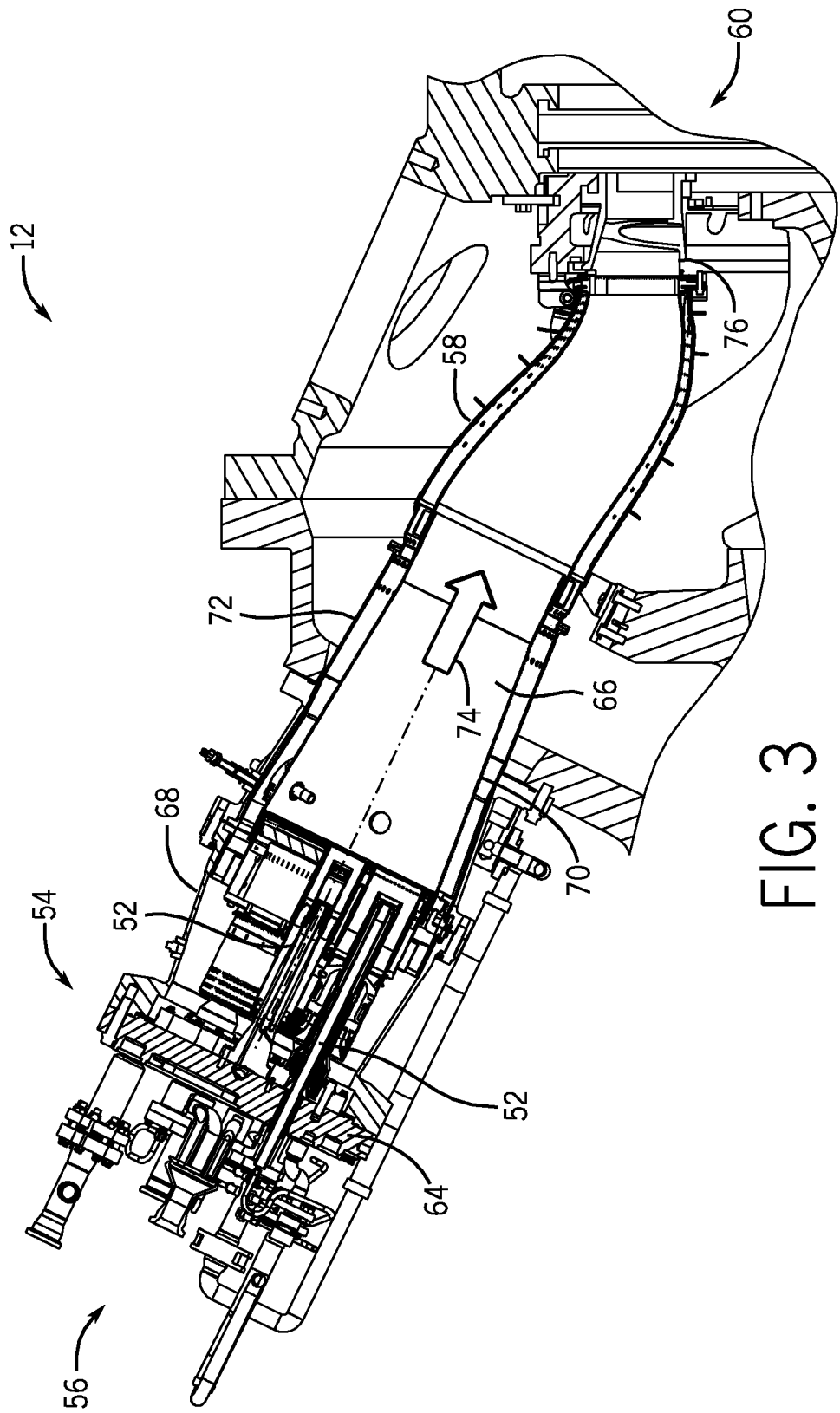
FIG. 3 is a partial cut away view of an embodiment of the combustor shown in FIG. 2.

A detail view of an embodiment of the combustor 12 is depicted in FIG. 3. The atomizing air, fuel, and water connections 56 are attached to an end cover 64, near the head end 54 of the combustor 12. The fuel nozzles 50 distribute the fuel 14 (FIG. 1), the atomizing air 20 (FIG. 1), and the water 24 (FIG. 1) from the connections 56 to a combustion chamber 66 within the combustor 12. In certain embodiments, the combustion chamber 66 may be designed to facilitate inducement of combustion dynamics. For example, the length of the combustion chamber 66 may be optimized to generate a frequency that may be used for ash cleaning. In certain embodiments, the fuel nozzles 50 may include concentric passages for directing the fuel 14, the atomizing air 20, and the water 24 to the combustion chamber 66. In certain embodiments, the atomizing air 20 may direct liquid fuel from the fuel nozzles 50 into the combustion section 66 in an annular ring. The pressure of the atomizing air 20 may be adjusted to change the shape and/or angle of the liquid fuel spray entering the combustion section 66.

Moreover, in certain embodiments, control devices, such as valves, pressure regulators, or the like, may be included within the combustor 12, for example, within the connections 56 or the fuel nozzles 50, to vary parameters, such as flow rate, pressure, fluid ratios, and pulse frequency, among others, of fluids entering the combustor 12. For example, control devices may be used to vary parameters of the fuel 14, atomizing air 20, and/or the water 24, in response to signals from the controller 44 (FIG. 1). For example, the pressure of the atomizing air 20 may be regulated by the controller 44 to adjust the spray angle of the liquid fuel and induce combustion dynamics. In another example, the flow of the fuel 14 may be pulsed through the fuel nozzles 50 at a frequency designed to induce combustion dynamics. In yet another example, the flow of the water 24 may be increased to induce combustion dynamics. Of course, in other embodiments, the control devices may be included upstream from the combustor 12.

The combustion chamber 66 is generally defined by a casing 68, a liner 70, and a flow sleeve 72. The flow sleeve 72 may be located coaxially about the liner 70 to direct pressurized air 18 (FIG. 1) from the compressor 32 (FIG. 1) into the combustion chamber 66 through perforations or other openings in the liner 70 and/or through passages located in the head end 54. Within the combustion chamber 66, the fuel 14 and pressurized air 18 may combust to form combustion gases 34 that may flow downstream in a direction 74 to the transition section 58 and the first stage 60 of the turbine 36. The combustion gases 34 may enter the first stage 60 through a first stage nozzle 76. As the combustion gases 34 flow through the first stage nozzle 76, ash may collect within the first stage nozzle 76.

Figure 4:
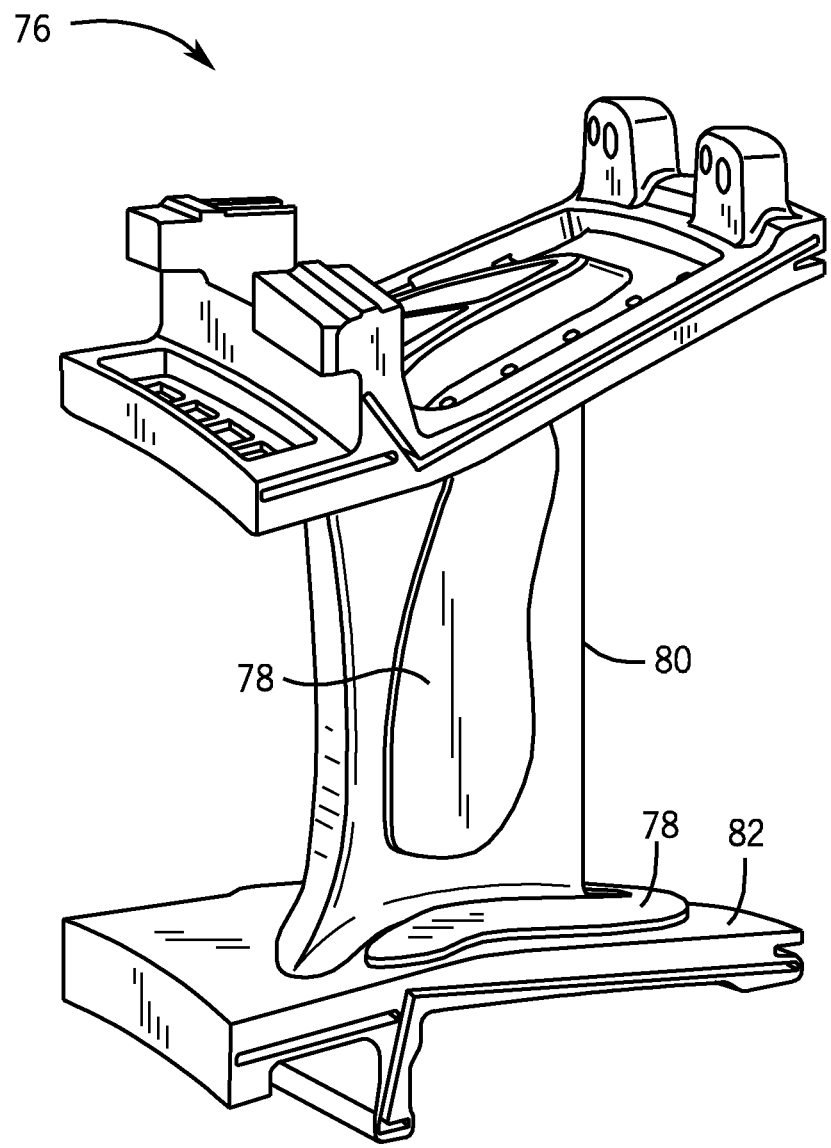
FIG. 4 is a detail view of a portion of an embodiment of the stage one nozzle shown in FIG. 3.

FIG. 4 is a cut away view of a portion of the first stage nozzle 76 shown in FIG. 3. Ash 78 may be deposited on components of the first stage nozzle 76. For example, as shown, ash 78 has been deposited on a guide vane 80 and on an inner band 82 of the first stage nozzle 76. However, in other embodiments, ash 78 may collect on various components of the first stage nozzle 76 and/or on turbine blades and other components located downstream of the first stage nozzle 76. In certain embodiments, the ash 78 may change the shape of the combustion gas flow path, thereby inhibiting turbine performance. As noted above, combustion dynamics may be induced to sonically remove the ash 78.

Figure 5:
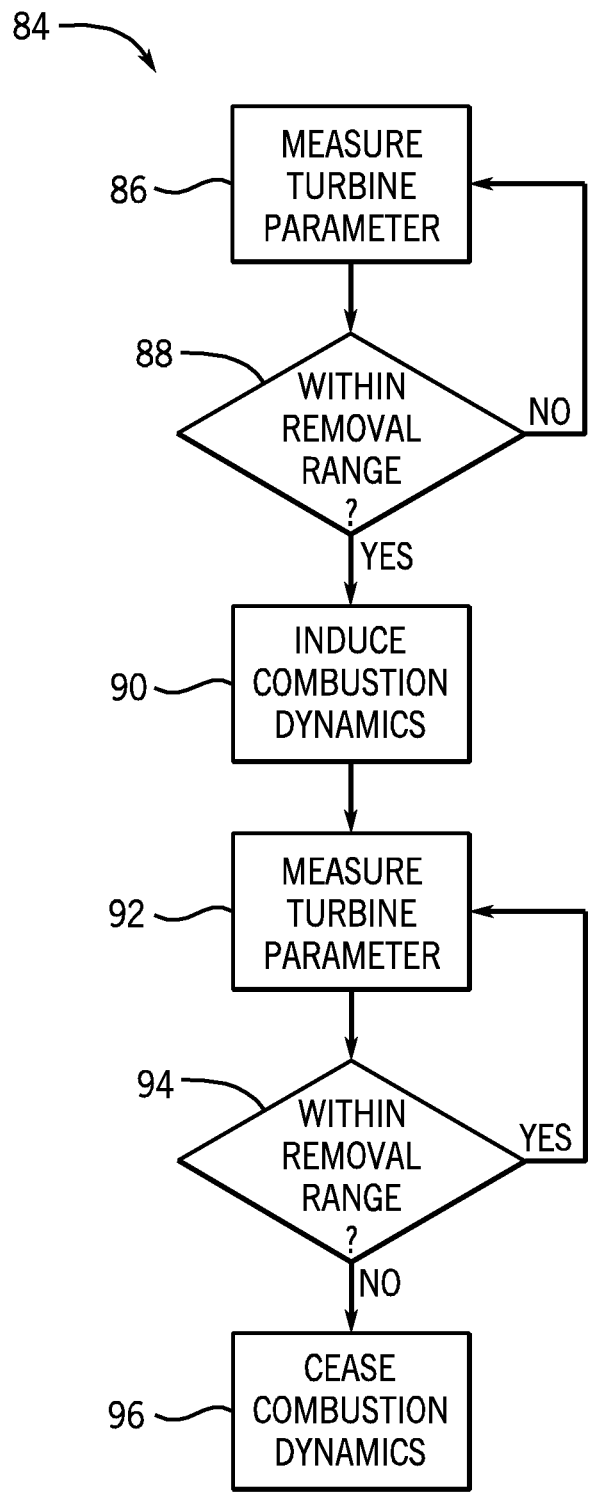
FIG. 5 is a flow chart depicting a method for inducing combustion dynamics to remove ash.

FIG. 5 is a flow chart depicting an embodiment of a computer and/or controller implemented method 84 for inducing combustion dynamics to remove ash from a gas turbine engine. For example, the method 84 may be implemented through hardware and/or software (e.g. code disposed on a memory or other machine readable medium). The method 84 may begin by measuring (block 86) a parameter of the gas turbine engine. For example, as shown in FIG. 1, the sensor 46 may measure a parameter, such as a pressure, temperature, flow rate, humidity level, emissions value, power output level, guide vane angle, valve position, or combinations thereof, among others. Any suitable parameter or combination of parameters may be employed that generally indicates ash buildup within the gas turbine engine. The sensor 46 may provide the measured parameter to the controller 44 or to the modeling system 50, which in turn may provide a calculated parameter, such as a model component multiplier, to the controller 44.

The controller 44 may then determine (block 88) whether the parameter falls within a range of values or thresholds where ash removal should occur. For example, the controller 44 may compare the parameter to a table of ranges or values. In another example, the controller 44 may use multiple parameters in conjunction with algorithms for determining whether ash removal should occur. If the parameter falls outside of the ash removal range, the gas turbine engine 10 may continue to operate in a steady state until the controller 44 receives a parameter that falls within the ash removal range.

Upon detecting a parameter that falls within the ash removal range, the controller 44 may induce (block 90) combustion dynamics. In certain embodiments, the controller 44 may automatically induce combustion dynamics in response to detecting a parameter, while in other embodiments, the controller 44 may wait for confirmation, for example, from an operator input. Specifically, the controller 44 may induce combustion dynamics by adjusting an operational parameter of the gas turbine engine 10. For example, as shown in FIG. 1, the controller 44 may vary a flow of fluid, such as the fuel 14, the atomizing air 20, or the water 24, entering the combustor 12. As may be appreciated, the water 24 may include water in a liquid form, steam form, or combinations thereof. Accordingly, the techniques described herein with respect to the water 24 may encompass both water injection and steam injection.

Specifically, the controller 44 may increase a flow rate of the water 24 (or steam) to increase the water to fuel injection ratio by approximately at least 10, 20, 30, 40, 50, 60, 70, 80, 90, or 100 percent. More specifically, the controller 44 may increase the water flow rate to increase the water to fuel injection ratio by approximately 20-35 percent, or even more specifically, by approximately 25-30 percent, and all subranges therebetween. In certain embodiments, the controller 44 may regulate a control device, such as a valve included within the water injection system 26 (FIG. 1) or within the fuel nozzle 50 (FIG. 2), to increase the water flow rate. However, in other embodiments the water flow rate may be regulated through other control devices, such as valves or pressure regulators, located upstream or downstream of the water injection system 26 (FIG. 1).

The controller 44 also may induce combustion dynamics by increasing or decreasing the pressure of the atomizing air 20 (FIG. 1) entering the combustor 12. In certain embodiments, the controller 44 may increase or decrease the atomizing air pressure by approximately at least 1, 5, 10, 20, 30, 40, 50, 60, 70, 80, 90, or 100 percent. More specifically, the controller 44 may adjust the atomizing air pressure by approximately 5-20 percent, and all subranges therebetween. In certain embodiments, the pressure adjustment may alter the injection angle of the liquid fuel 14 exiting the fuel nozzle 50 to induce combustion dynamics. For example, the injection angle may be altered by at least approximately 1, 5, 10, 15, 20, 25, or 30 percent. The controller 44 may govern operation of a control device, such as a valve or pressure regulator, to adjust the atomizing air pressure.

The controller 44 also may induce combustion dynamics by pulsing the flow of the fuel 14 entering the combustor 12. For example, a valve may be included in the fuel supply system 16, within the fuel nozzle 50, or upstream or downstream of the fuel supply system 16 to control the frequency of pulsations for the fuel flow entering the combustor 12. In certain embodiments, the controller 44 may receive a measured parameter from a sensor, such as the sensor 48 (FIG. 1), to determine a frequency existing within the combustor 12. The controller 44 may then pulse the flow at a rate that substantially matches, or is a multiple of, the detected frequency.

In general, the controller 44 may induce combustion dynamics during operation of the gas turbine engine 10. While combustion dynamics are induced to remove ash, the gas turbine engine 10 may continue to maintain its previous power output, even when operating under full power. For example, in certain embodiments, combustion dynamics may be induced while the gas turbine engine 10 maintains at least approximately 1, 5, 10, 20, 30, 40, 50, 60, 70, 80, 90, or 100 percent of its power output. More specifically, combustion dynamics may be induced while the gas turbine engine 10 maintains at least approximately 90-100 percent of its power output, and all subranges therebetween.

The inducement of combustion dynamics may alter the frequency, and/or pressure amplitude of the pressure oscillations in the combustor 12 to shake loose deposits on components of the gas turbine engine 10. During inducement of combustion dynamics, the frequency may increase by 100, 200, 300, 400, 500, 600, or 700 percent. In certain embodiments, the frequency may increase by approximately 200-500 percent, and all subranges therebetween. For example, in certain embodiments, during steady state operation, the pressure oscillations may have a frequency of approximately 80 Hz, while during inducement of combustion dynamics the frequency may range from approximately 180-1,000 Hz. During inducement of combustion dynamics, the amplitude may increase by 1, 5, 10, 15, 20, 25, 30, 35, 40, 45, 50, 55, 60, 65, or 70 times its normal magnitude. In certain embodiments, the amplitude may increase by approximately 2-50 times its normal magnitude during steady state operation, and all subranges therebetween. For example, under steady state operation, a peak to peak amplitude may be approximately 2.5 psi. However while combustion dynamics are induced the peak to peak amplitude may increase to approximately 6-10 psi. In certain embodiments, the peak to peak amplitude may increase by approximately at least 100, 200, 300, 400, 500, 600, or 700 percent.

After inducing combustion dynamics, the controller 44 may then measure (block 92) another parameter of the gas turbine engine 10. The parameter may be the same parameter previously measured by the sensor 46 (FIG. 1) to determine whether the gas turbine engine was operating within the ash removal range. For example, the sensor 46 may continuously or intermittently measure a combustor pressure and provide the measured values to the controller 44. The controller 44 may then use the measured values to determine when the gas turbine engine is operating within the ash removal range, to induce combustion dynamics, and when the gas turbine engine is operating outside of the ash removal range, to cease combustion dynamics. In other embodiments, the parameter may be a different parameter then the one previously measured by sensor 46. Regardless of whether the same or different parameter is measured, any suitable type of parameter may be employed, such as time elapsed since inducement of combustion dynamics, pressure, temperature, or combinations thereof, among others. Moreover, in certain embodiments, the sensor 46 may provide the measured parameter to the modeling system 50 (FIG. 1), which in turn may provide a calculated parameter, such as a model component multiplier, to the controller 44. Accordingly, the controller 44 may use measured parameters (i.e., pressures, temperatures, time), model parameters, or combinations thereof to determine when to cease inducing combustion dynamics.

The controller 44 may then use the parameter to determine (block 94) whether the gas turbine engine 10 is operating outside of the ash removal range. For example, the controller 44 may compare the parameter to a table of ranges or values. In another example, the controller may use multiple parameters in conjunction with algorithms for determining whether combustion dynamics should cease. If the parameter falls within the ash removal range, the controller 44 may continue to induce combustion dynamics until a receiving a parameter that falls outside of the ash removal range.

Upon detecting that a parameter falls outside of the ash removal range, the controller 44 may cease (block 96) inducing combustion dynamics. For example, the controller 44 may return the water flow rate, the atomizing air pressure, or the fuel pulse frequency to their prior values, or to values designed to reduce combustion dynamics. The controller 44 may then allow the gas turbine engine 10 to operate under normal operating conditions until a parameter is detected within the ash removal range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   measuring a first parameter of a turbine engine;
   determining whether the first parameter is within a range indicative of a deposit buildup on a surface within the turbine engine;

controlling a second parameter of the turbine engine to increase combustion dynamics to remove the deposit buildup from the surface within the turbine engine at least partially in response to determining that the first parameter is within the range indicative of the deposit buildup, wherein controlling the second parameter comprises adjusting one or more characteristics of a fuel flow, a water flow, a steam flow, an atomizing flow, a liquid flow, one or more flows through a fuel nozzle, or a combination thereof, to remove the deposit buildup from the surface within the turbine engine; and controlling the second parameter of the turbine engine to reduce combustion dynamics after removal of the deposit buildup from the surface within the turbine engine.

2. The method of claim 1, wherein measuring the first parameter comprises measuring pressure, temperature, performance, efficiency, time, or a combination thereof.

3. The method of claim 1, wherein controlling the second parameter comprises increasing a water to fuel injection ratio by at least 20 percent to remove the deposit buildup from the surface within the turbine engine.

4. The method of claim 1, wherein controlling the second parameter comprises pulsing the fuel flow, adjusting an atomizing air pressure of the atomizing flow, adjusting a water flow rate of the water flow, adjusting a steam flow rate of the steam flow, or a combination thereof, to remove the deposit buildup from the surface within the turbine engine.

5. The method of claim 1, wherein controlling the second parameter comprises increasing a pressure amplitude or frequency of the combustion dynamics, or a combination thereof, to increase the combustion dynamics to remove the deposit buildup from the surface within the turbine engine.

6. The method of claim 5, wherein controlling the second parameter to increase combustion dynamics comprises increasing the pressure amplitude by at least a factor of two to remove the deposit buildup from the surface within the turbine engine.

7. The method of claim 1, wherein controlling the second parameter to increase combustion dynamics occurs while maintaining at least 90 percent of power output of the turbine engine.

8. The method of claim 1, wherein controlling the second parameter to increase combustion dynamics comprises increasing pressure variations to shake loose the deposit buildup from the surface of a turbine nozzle, a turbine blade, or a combination thereof.

9. The method of claim 1, comprising:
measuring a third parameter of the turbine engine; and
determining whether the third parameter is within the range indicative of the deposit buildup on the surface within the turbine engine;
wherein controlling the second parameter to reduce combustion dynamics comprises adjusting the second parameter to reduce combustion dynamics in response to determining that the third parameter is outside the range.

10. The method of claim 9, wherein the third parameter and the first parameter are the same.

11. The method of claim 1, wherein determining whether the first parameter is within range comprises calculating a model component multiplier based on the first parameter and determining whether the model component multiplier is above or below a threshold value.

12. The method of claim 1, wherein the one or more characteristics comprise a flow rate, a pressure, a pulsation frequency, an injection angle, an injection shape, or a combination thereof.

13. The method of claim 1, wherein controlling the second parameter comprises adjusting one or more characteristics of the water flow, the steam flow, or a combination thereof, to remove the deposit buildup from the surface within the turbine engine.

14. The method of claim 1, wherein controlling the second parameter comprises adjusting one or more characteristics of the fuel flow to remove the deposit buildup from the surface within the turbine engine, wherein the one or more characteristics of the fuel flow comprise a pulsation of the fuel flow, an atomization of the fuel flow, an injection angle of the fuel flow, a spray shape of the fuel flow, a flow rate of the fuel flow, or any combination thereof.

15. A system, comprising:
a turbine engine controller configured to determine whether one or more parameters of a turbine engine are within a range indicative of a deposit buildup on a surface within the turbine engine, and the turbine engine controller is configured to temporarily increase combustion instabilities to remove the deposit buildup from the surface within the turbine engine during operation of the turbine engine in response to determining that the one or more parameters are within the range indicative of the deposit buildup, wherein the turbine engine controller is configured to temporarily increase the combustion instabilities by adjusting one or more characteristics of a fuel flow, a water flow, a steam flow, an atomizing flow, a liquid flow, one or more flows through a fuel nozzle, or a combination thereof, to remove the deposit buildup from the surface within the turbine engine.

16. The system of claim 15, comprising a plurality of sensors configured to measure the one or more parameters, wherein the one or more parameters are indicative of a possibility of the deposit buildup of combustion particulate on the surface within the turbine engine.

17. The system of claim 16, wherein the plurality of sensors comprises a pressure sensor, a temperature sensor, a power output sensor, an emissions sensor, or a combination thereof.

18. The system of claim 15, wherein the turbine engine controller is configured to temporarily increase combustion pressure variations for a time period of less than 10 minutes while maintaining substantially full power output of the turbine engine to remove the deposit buildup from the surface within the turbine engine.

19. The system of claim 15, wherein the turbine engine controller is configured to temporarily increase combustion instabilities by increasing a water to fuel injection ratio by at least 20 percent to remove the deposit buildup from the surface within the turbine engine.

20. The system of claim 15, wherein the turbine engine controller is configured to temporarily increase combustion instabilities by adjusting an atomizing air pressure of the atomizing flow by at least 5 percent to remove the deposit buildup from the surface within the turbine engine.

21. The system of claim 15, wherein the turbine engine controller is configured to temporarily increase combustion instabilities in response to receiving a model component multiplier from a real time modeling system to remove the deposit buildup from the surface within the turbine engine.

22. The system of claim 15, wherein the turbine engine controller is configured to temporarily increase the combustion instabilities by adjusting one or more characteristics of the water flow, the steam flow, or a combination thereof, to remove the deposit buildup from the surface within the turbine engine.

23. The system of claim 15, wherein the turbine engine controller is configured to temporarily increase the combustion instabilities by adjusting one or more characteristics of the fuel flow to remove the deposit buildup from the surface within the turbine engine, wherein the one or more characteristics of the fuel flow comprise a pulsation of the fuel flow, an atomization of the fuel flow, an injection angle of the fuel flow, a spray shape of the fuel flow, a flow rate of the fuel flow, or any combination thereof.

24. The system of claim 15, comprising the turbine engine having the turbine engine controller.

25. A system, comprising:
a turbine engine, comprising:
  a combustor;
  a fuel nozzle configured to supply a plurality of fluids into the combustor, wherein the fluids comprise fuel, atomizing air, water, or a combination thereof; and
  a controller configured to determine whether one or more parameters of the turbine engine are within a range indicative of a deposit buildup on a surface within the turbine engine, and the controller is configured to adjust flow of the fluids to temporarily increase combustion dynamics to remove the deposit buildup from the surface within the turbine engine during operation of the turbine engine in response to determining that the one or more parameters are within the range indicative of the deposit buildup.

26. The system of claim 25, wherein the turbine engine is configured to increase a water to fuel injection ratio of the fuel nozzle to temporarily increase the combustion dynamics to remove the deposit buildup from the surface within the turbine engine.

27. The system of claim 25, wherein the turbine engine is configured to vary an injection angle of the fuel nozzle to temporarily increase the combustion dynamics to remove the deposit buildup from the surface within the turbine engine.

28. The system of claim 25, comprising a real time modeling system configured to generate model component multipliers based on the one or more parameters, wherein the model component multipliers are configured to adjust the model to predict the one or more parameters, and the turbine engine is configured to adjust flow of the fluids based on the model component multipliers to remove the deposit buildup from the surface within the turbine engine.

29. The system of claim 25, wherein the one or more parameters are indicative of efficiency or performance, and the turbine engine is configured to automatically adjust the flow of the fluids to temporarily increase the combustion dynamics to remove the deposit buildup from the surface within the turbine engine in response to the one or more parameters.

* * * * *